United States Patent [19]

Tomioka et al.

[11] Patent Number: 5,660,866
[45] Date of Patent: Aug. 26, 1997

[54] METHOD OF MAKING A COMBINATION POPSICLE AND DEVICE THEREFOR

[75] Inventors: Hisahiro Tomioka, Takatsuki; Masakazu Shimazaki, Kawasaki; Susumu Makino, Takatsuki; Kimitaka Takeno, Toyokawa, all of Japan

[73] Assignee: Kanebo, Ltd., Tokyo, Japan

[21] Appl. No.: 86,908

[22] Filed: Jul. 7, 1993

Related U.S. Application Data

[62] Division of Ser. No. 828,996, filed as PCT/JP91/00762, Jun. 5, 1991, published as WO91/18519, Dec. 12, 1991, Pat. No. 5,256,426.

[30] Foreign Application Priority Data

Jun. 6, 1990 [JP] Japan ............... 2-149107

[51] Int. Cl.⁶ ........................... A23G 9/00
[52] U.S. Cl. ............... 426/100; 426/101; 426/249; 426/134; 426/139; 426/565
[58] Field of Search ............... 426/100, 101, 426/249, 565, 566, 567, 134, 139

[56] References Cited

U.S. PATENT DOCUMENTS

| | | | |
|---|---|---|---|
| D. 297,880 | 10/1988 | Beckham et al. | 426/102 D |
| 1,718,997 | 7/1929 | Burt | 426/565 |
| 1,901,394 | 3/1933 | Hassell | 426/101 |
| 2,048,364 | 7/1936 | Willems | 426/249 |
| 2,570,031 | 10/1951 | Gibson | 426/101 |
| 2,747,525 | 5/1956 | Lund | 426/565 |
| 4,310,559 | 1/1982 | Mita et al. | 426/101 |
| 4,353,927 | 10/1982 | Lovercheck | 426/101 |
| 5,256,426 | 10/1993 | Tomioka et al. | 426/565 |

*Primary Examiner*—Jeanette Hunter
*Attorney, Agent, or Firm*—Armstrong, Westerman, Hattori, McLeland & Naughton

[57] ABSTRACT

The invention relates to a combination popsicle wherein an ice layer whose surface is uneven is formed on the circumference of a core stuff, a method for making the same and a device for the method. As an ice material for forming the ice layer, irregular ice crystals in size are used which is provided by collecting uniformly dispersed fine ice crystals in a cohering process to form into lumps and by crushing the lumps. Because of this, with the irregular ice crystals, uneven form which is clear can be constantly formed on the surface of the ice, popsicle.

1 Claim, 6 Drawing Sheets

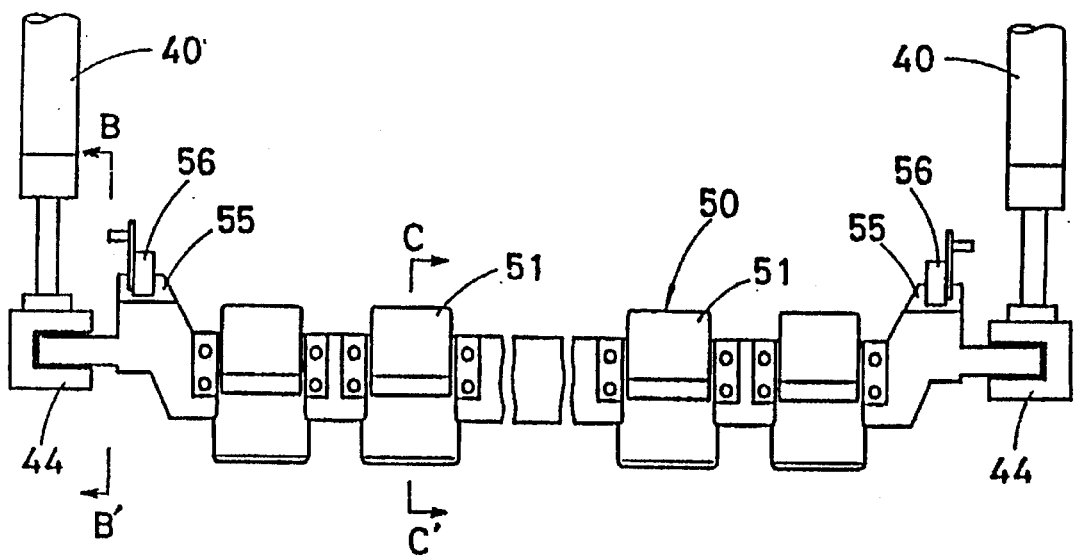
FIG. 11
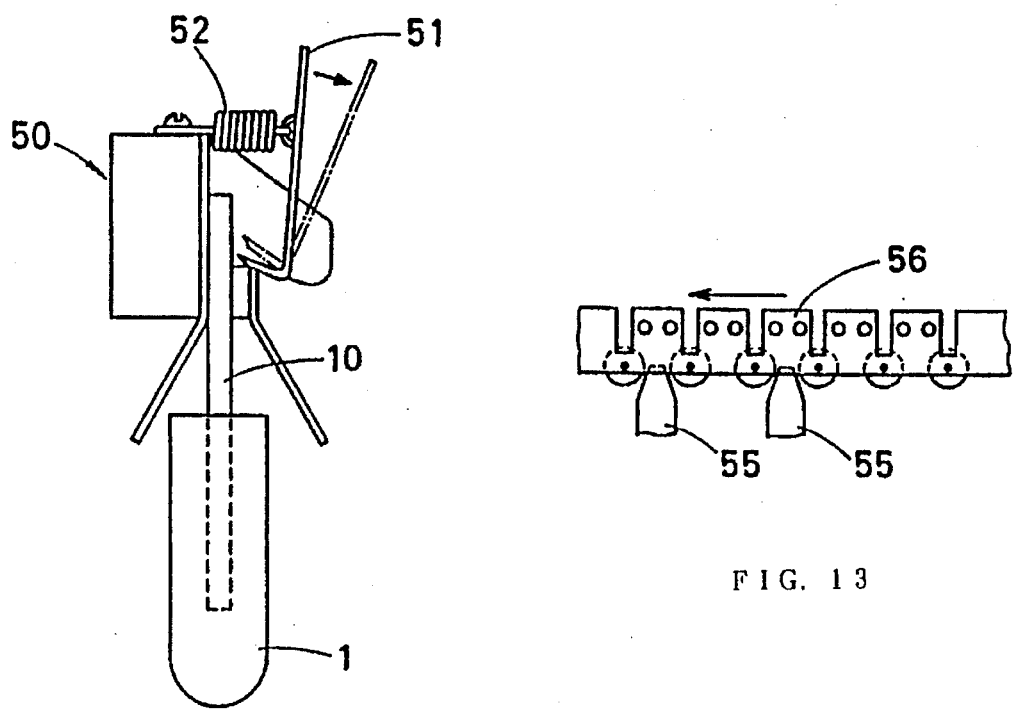
FIG. 12
FIG. 13

5,660,866

METHOD OF MAKING A COMBINATION POPSICLE AND DEVICE THEREFOR

This is a division of application Ser. No. 07/828,996, filed as PCT/JP91/00762, Jun. 5, 1991 published as WO91/ 18519, Dec. 12, 1991, now U.S. Pat. No. 5,256,426.

FIELD OF THE INVENTION

The invention relates to a combination popsicle having a core or core stuff made of ice cream, cookie and the like, and an ice layer of ice cream, a sherbet, cracked ice with syrup or the like, integrally formed on the outer periphery of the core stuff, a method of making the combination popsicle and a device used in the manufacturing method.

BACKGROUND OF THE INVENTION

Conventionally various ices of the bar type are on the market. For example, there are a single kind of ice cream 1 as shown in FIG. 17, an ice cream 1 covered with a layer of chocolate 2 as shown in FIG. 18, and a sherbet 3 forming a shell containing cracked ice with syrup 4 therein as shown in FIG. 19. These ices are shaped by using molds whose kinds are limited, so that it is difficult to give a unique shape to the ices. As those ices have no characteristic appearance and their surface is flat, they have little factors which attract consumers' eyes. Although combination ices in which a surface of ice cream 1 is covered with relatively larger granules of cookie crunch or nuts 5, as shown in FIG. 20 are on the market recently, this type of combined ice bas a disadvantage that the cookie crunch or the like thereon easily falls off the ice cream 1 when it is subjected to physical impact upon transportation or in storage.

Accordingly, an object of the present invention is to provide a combination popsicle wherein ice, such as ice cream, a sherbet and cracked ice with syrup is formed on the outer periphery of the core stuff integrally or in a body, the surface of the combination ice has unevenness or irregularity to give a novel appearance, a method of manufacturing the combination ice and a device to be used in the manufacturing method.

SUMMARY OF THE INVENTION

To accomplish the above object, the present invention provides a combination popsicle, as a first embodiment, comprising a core stuff of edible material and an ice layer having random uneven surface, the ice layer being formed on the outer periphery of the core stuff integrally, the mean difference in height between a protruded part and a recessed part on the surface of the uneven ice layer being 0.5 to 6 mm, a method of making a combination popsicle in which an ice layer having random uneven surface is formed on the outer periphery of a core stuff of edible material integrally, as a second embodiment, comprising steps of preparing an ice mixture containing fine or minute crystals of ice, making the fine or minute crystals cohere so as to cake or lump, agitating the ice mixture to crush the lumps into granules of uneven diameters and to re-scatter them, preparing a core stuff and cooling its surface, soaking the core stuff in a bath of the semi-frozen ice mixture having the re-scattered granules, and causing a semi-frozen ice layer formed on the outer periphery of the core stuff in the soaking step to be frozen and set by a quick freezing, and as a third embodiment, a device for manufacturing a combination popsicle comprising a main conveyer of an intermittent feed motion, a sub-conveyer of an intermittent feed motion synchronized with that of the main conveyer, a first transferring means for transferring the core stuff brought to a predetermined stopping position P by the main conveyer to a predetermined stopping position Q of the sub-conveyer, and a second transferring means for transferring the core stuff brought to a stopping position R which is n pitch away from the core stuff moved position Q to a stopping position S which is n pitch away from the stopping position P of the main conveyor, said core stuff transferred from the position Q to the position R by the sub-conveyer being soaked in a bath of a semi-frozen ice mixture.

The inventors made a series of researches for providing a combination popsicle which has protrusions and recesses on the surface of an ice layer at random to give a unique appearance, without being restricted by molds, and found that when a core stuff of edible material is soaked in a bath of semi-frozen ice mixture containing ice granules of uneven diameters, an ice layer is formed having random protrusions and recesses on its surface because of the ice granules can be formed circumferentially on the core stuff, which led to the present invention.

The term "ice mixture" used in the present invention is not limited only to a so-called ice mixture in a narrow sense but also include a mixture of cracked ice and syrup broadly. The "semi-frozen state or semi-frozen" is defined as a state that 4 to 70% of water content in the ice mixture is frozen. With less than 4% of the water content of the ice mixture, the fluidity of the mixture is too high to make the obtained surface of an ice layer of the desired irregularity. On the contrary, with more than 70% of the water content frozen, the fluidity of the ice mixture becomes too low to cover the core stuff uniformly and initially provided unevenness is so extreme or radical that the protruded parts fall off easily.

Next, the present invention is described in detail.

FIG. 1 is a sectional view showing an example of the combination popsicle according to the present invention. In the drawing, reference numeral 1 denotes a core stuff made of ice cream, 2 an ice layer made of sherbet integrally layered on the outer periphery of the core stuff 1, 6 flesh of orange scattered in the ice layer 2, and 10 a wooden flat bar.

The core stuff 1, for example, can be prepared in the following manner. At first, a predetermined ice cream 1a is prepared and then filled into a mold 11 soaked in refrigerant 12 as shown in FIG. 2. The end of flat bar 10 is inserted into the ice cream 1a as shown in FIG. 3 and the ice cream 1a is frozen in this state and then removed from the mold 11 to obtain a structure 7 comprising a core stuff 1 with the inserted flat bar 10.

The core stuff 1 is made of ice cream 1a in the above example, but it may be made of any unfluidic material which is edible, such as ice confection, sponge cake and biscuits, and therefore is not limited to the ice cream 1a. Also, the core stuff may be multi-layered formed having therein of different edible material, such as chocolate or the like. When using ice material, such as ice cream, those of which overrun is within the scope of 0 to 150% is preferable. When overrun is not less than 150%, the core material 1, when soaked in the ice bath, melts unfavorably in the midst of operation. Furthermore, the surface temperature of the core stuff 1 to be soaked in the ice bath is preferably set to be 15° C. or lower and it is further preferable to soak the core stuff 1 after pre-cooling it to −5° C. or lower. In particular, when the core stuff 1 with a surface temperature cooled to −13° to −15° C. is soaked in the ice bath, the binding effect of the core stuff 1 and the ice layer 2 is strong so as to prevent the ice layer 2 from being peeled off.

The ice layer 2 covering the circumference of the core stuff 1 is completed in such manner, as shown in FIG. 4, wherein an ice bath 13 containing semi-frozen sherbet 2a (with orange flesh 6 scattered therein) is prepared, the core stuff 1 is soaked in a predetermined time therein and then taken out of the bath to give a layer, making the sherbet 2a adhere on the outer periphery of the core stuff 1. The core stuff 1 with the layer formed thereon is soaked in a bath of liquid nitrogen for quickly freezing the sherbet 2a on the surface of the core stuff to thereby obtain a combined ice as shown in FIG. 1. The ice layer 2 is provided with unevenness or irregularities on its surface at random to give a unique appearance not provided conventionally.

The protruded part and recessed part on the surface of the ice layer 2 are required that their average difference of height Ln is from 0.5 to 6 mm by, for example, controlling the freezing state of the sherbet. That is, when Ln is less than 0.5 mm, the difference in height between the protruded part and recessed part is too small and the surface has an appearance which is almost the same as the flat surface of ices obtained by using a conventional mold, so that it is unable to give a unique impression. When Ln is more than 6 mm, the protrusions fall from the ice and the shape is broken in storage and upon transportation of the products.

The mean difference of height Ln is determined as follows. A specimen of the combination popsicle is first cut vertically on a plane including the flat bar 10 as shown in FIG. 5. At any free point P on the outer peripheral edge of the section, an interval a (mm) between the bottom of a recess which is the closest to the point P and the surface of core stuff 1 and an interval b (mm) between the top of the protruded part which is the nearest to the point P and the surface of core stuff 1 are measured.

The difference of the both intervals L (mm) is given by a following formula; L=b−a. The measurement is carried out for twenty specimens to obtain a mean value Ln of the interval L.

In place of the sherbet 2a for the ice material, ice cream, cracked ice with syrup or the like may be used in combination of two kinds or more and flesh of various fruits, chocolate chips or the like may be scattered in the ice material as the above example.

For considerations of the adhesion of the above ice material in the form of granules to the core stuff 1, the temperature of the core stuff 1 is preferably lower than temperatures of the ice bath, which are generally set to −1.5° to −5° C. When the temperature of the ice mixture in the bath 13 is lower than −5° C., the adhering amount of ice material on the core stuff 1 tends to be variable. And when the temperatures are higher than −1.5° C., there appears a tendency that the surface of ice material adhered on the core stuff 1 does not have random unevenness. Also, when the total solid part of the ice material is more than 60% by weight ("%" is used for "% by weight" hereafter), the viscosity of the material increases, so that the surface of ice material adhered on the core stuff 1 does not have protruded parts and recessed parts at random. Hence, total solid part is preferably set to 0 to 60%, particularly 10 to 50%. Furthermore, in the case that what is with overrun, such as ice cream or core stuff is employed as the ice material, their overrun is preferably set to 0 to 80% because when the overrun is more than 80%, there appears a tendency that a sufficient amount of ice material does not adhere on the core stuff 1 even when the surface temperature of the core stuff is kept at −5° C. or lower.

In the present invention, it is preferable to prepare an ice confection material in the following manner by using a device as shown in FIG. 6. First, the ice material is frozen by a freezer 20 so as to be brought into a semi-frozen state, wherein ice crystals 21 are scattered uniformly in the form of minute particles as shown in FIG. 8(a). The ice material is then transmitted through a feeding line 22 (return to FIG. 6) keeping it at a predetermined temperature, wherein the minute crystals of ice 21 are collected to be formed into granules of large diameter as shown in FIG. 8(b). Thereby the minute crystals 21 become in a lump form. The lumped ice crystals 21 do not pass through 2.2 mesh (Refer to Japanese Industrial Standard Z8801, 9.5 mm in aperture size, 2.24 mm in wire diameter). The time for transmitting through the feeding line for the cohering or collecting process is preferably 5 to 60 min. With less than 5 min., cohering of minute crystals 21 is insufficient, so that difference of height in unevenness on the surface of resultant ice layer 2 is poor. Also, with a time of more than 60 min., the minute crystals 21 are condensed too much to larger lumps, so that they tend to be difficult to be bound onto the core stuff 1. The ice material having minute and lumped ice crystals 21 is then stored in the ice bath 13 and agitated by blades 23 or the like to be broken and scattered or dispersed again in semi-frozen ice mixture.

Ice crystals 21 are thereby uniformly scattered therein in the form of uneven granules as shown in FIG. 8(c). The granules 21 in this state are able to pass through the above 2.2 mesh. This course of the processes always stably provides an ice material to be an ice layer 2 with a unique uneven form as aforementioned. A core stuff 1 (with a flat bar 10) is soaked in the ice bath 13, as shown in FIG. 7, for 0.1 to 20 sec. and more preferably 0.1 to 3 sec. for putting the ice material onto the outer periphery of the core stuff 1 to obtain an combined ice as aforementioned. In FIGS. 6 and 7, reference numeral 24 is a feeding line for fruit flesh 6.

Conditions of the agitation for re-scattering the lumps 21 to be broken and scattered again as above depend on various factors, such as temperatures, overrun, solid content, and specific compositions of the ice material. When an ice material of orange sherbet having 20% of solid content with 10% of over-run is used, favourable uneven granules of ice crystals are provided by agitating at 150 rpm for 15 min. When an ice material of milk sherbet having 30% of solid content with 20% of over-run is used, it is preferable to agitate at 100 rpm for 10 min.

In the above-mentioned method, the freezer 20 is employed to bring the ice material into a semi-frozen state, but an ice crusher 25 may be used, as shown in FIG. 9, to provide minute ice crystals 21 to be fed into the feeding line 22. Then other material (a syrup, fruit juices or the like) except ice joins the flow of the fed minute crystals 21 through a line 26 connected to the feeding line 22.

It is preferable to conduct a series of operations, such as transferring of the core stuff 1, soaking and pulling up thereof in and from the ice bath 13 continuously by using a system as shown in FIG. 10. In the figure, A is a general Vita freeze operation line wherein, together with the movement of a conveyer 31 mounting molds 11 (twelve pieces in a row) at a predetermined interval, a core stuff 1 is frozen in each mold 11 and then hot water is sprayed to the molds 11 at the downstream side of the molds 11 and thereby the core stuff 1 is taken out of each mold 11.

B is a conveyer which conveys the core stuff 1 taken from the Vita freeze operation line A. During the conveyance, the core stuff is applied on its surface with the ice material to give an ice layer 2 on the surface of the core stuff. The main conveyer B is provided at its downstream side with a sub-conveyer C which performs an intermittent feeding motion synchronized with an intermittent motion of the main conveyer B.

The main conveyer B is provided from its upstream side to downstream side with four pairs of cylinders 40–43, each cylinder of the respective pairs facing with each other having the conveyer line therebetween. Grip plates 50 for carrying the ices are supplied in order on rails 44 of the conveyer line before the cylinders 40 at the upstream side of the conveyer operation. FIG. 11 is a sectional view of the line A—A' in FIG. 10, showing the grip plate 50 supplied on the rails 44.

The grip plates 50 are supported at both of their right and left ends by the rails 44 having U-like shaped cross-section and are provided with twelve clips 51 arranged in a row laterally for grasping twelve core stuffs 1 in a row at a time. As shown in FIG. 12, a sectional view of C—C' in FIG. 11, the clip 51 is always pressed against the side surface of the grip plate 50 by a compressed spring 52, so that the flat bar 10 of the core stuff 1 can be gripped between the clip 51 and the side surface of the grip plate 50 by bringing down the grip plate 50. The grip plate 50 has at both ends protrusions 55 (refer to FIG. 11) and, as shown in FIG. 13, are held by a chain 56 of the conveyer B and moved in the direction shown by the arrow.

The rails 44 of the main conveyer B are cut at the positions where the four pairs of cylinders 40–43 are disposed. Separate rail members 44a are supplemented therein as shown in FIG. 14, a sectional view of the line B—B' in FIG. 11. The rail member 44a is mounted to the end of a piston rod of each cylinder 40 to 43 to move up and down following vertical movement of the piston rod.

The cylinders 40 placed at the most upstream side are adapted to move the grip plate 50 down and up when the grip plate 50 reaches the conveyer stopping position X of the conveyer along the rail 44 during stoppage of the conveyer so that the grip plate 50 takes out the core stuffs 1 of the molds 11 on the Vita freeze operation line A to transfer the core stuffs to the line of the conveyer B.

The cylinders 41 operate similarly to, the cylinders 40. They reciprocate to move down and up the grip plate 50 together with the rail members 44a when the grip plate 50 reaches the stopping position Y of the conveyer B so that the core stuffs 1 are soaked in the ice bath 13 under the conveyer line to cause the ice material to adhere on the outer periphery of the core stuffs 1. Reference numeral 61 denotes blades for agitating the ice material.

The cylinders 42 reciprocate to move the grip plate 50 up and down together with the rail members 44a when the grip plate 50 reaches the stopping position P of the main conveyer B so that the grip plate 50 is transferred to a stopping point Q of the sub-conveyer C.

When the sub-conveyer C receives at its stopping position Q with the grip plate 50 engaged with the rail members 44a, it causes the grip plate 50 to be engaged with rails 45 extending along the sub-conveyer C and transferred by 2 pitches using a conveying chain (not shown). A liquid nitrogen tank 62 is disposed under the sub-conveyer C. The core stuffs 1 move within the liquid nitrogen tank 62 with 2 pitch feeding of the grip plate 50 and the ice material on the surface of the core stuffs 1 is frozen and set to give an ice layer 2 during this movement.

The cylinders 43 reciprocate to move the rail members 44a up and down which are disposed at a stopping position S of the main conveyer B spaced by 2 pitches from the stopping position P so that the rail members 44a are moved down to a stopping position R of the sub-conveyer C spaced by 2 pitches from the stopping position Q and returned to the original position S, whereby when reaching the stopping position R, the grip plate 50 is received by the rail members 44a to be returned to the main conveyer B.

The main conveyer B is provided at the downstream end with a means (not shown) for loosening the clips 51 on the grip plate 50. The core stuffs 1 are released from the grip plate 50 and taken out of the conveyer line through a shooter 63.

As seen, in the present apparatus, the core stuffs 1 are provided with ice material on their outer peripheries at the stopping position Y of the main conveyer B, moved from the stopping position P to the stopping position Q of the sub-conveyer C, transferred by 2 pitches with the sub-conveyer C to be passed through inside of the liquid nitrogen bath 62 so that the ice material on the core stuff is frozen and set, and returned at the stopping position R spaced by 2 pitches from the stopping position Q to the stopping position S of the main conveyer B (spaced by 2 pitches from the stopping position P). Therefore, even when the core stuff is required to have a very thick ice layer, it can be moved by 2 pitches in the liquid nitrogen bath 62 to thereby be fully frozen and set sufficiently. In this case, since the main conveyer B and the sub-conveyer C synchronously perform the same intermittent feeding motion, transferring of the core stuffs 1 is not delayed in time due to the above treatment. Also, since the core stuffs 1 are transferred always in a state of being suspended by the grip plate 50, they are neither slanted nor subjected to high impact and their quality is not deteriorated.

With the above system, only one ice layer 2 is formed on the surface of the core stuff 1, but when an ice mixture layer 70 and a sherbet layer 71 are formed into layers alternately as shown in FIG. 15, the system comprises, as shown in FIG. 16, a main conveyer B, three sub-conveyers $C_1$, $C_2$ and $C_3$ which perform intermittent feeding motion synchronized with that of the main conveyer B, and nine cylinders 81 to 89 to provide a multi-layered ice. The core stuffs 1 picked up by the main conveyer B as well as in the above example, at a stopping position D of the main conveyer B, are first soaked in a sherbet bath 90 placed under the conveyer line by cylinders 81 to be applied with a sherbet material. The core stuffs 1 are then transferred at a stopping position E to the sub-conveyer $C_1$ by the cylinders 82 and they are soaked in a liquid nitrogen bath 91 disposed under the sub-conveyer and moved by a predetermined pitch in the bath 91 to freeze and set the sherbet material therein. At a stopping position F of the main conveyer B, cylinders 83 are moved down and up to return the core stuffs 1 to the main conveyer B. The core stuffs 1, when reached a stopping position G, are moved down by cylinders 84 to be soaked in an ice mixture bath 92 placed under the conveyer and applied with an ice mixture, and further transferred by the sub-conveyer $C_2$ between stopping positions H and I similarly to the above to cause the applied ice mixture to be frozen and set in a liquid nitrogen bath 93. After returning to the main conveyer B, the core stuffs 1, when reached a stopping position J, are moved down by cylinders 87 to be soaked in an underlying sherbet bath 94 and applied with a sherbet material, and further transferred by the sub-conveyer $C_3$ between stopping positions K and L similarly to the above to cause the applied sherbet to be frozen and set in a liquid nitrogen bath 95. Resultantly, the multi-layered ice alternately provided with an ice mixture layer 70 and a sherbet layer 71 is obtained as shown in FIG. 15.

Freezing and setting process for forming ice layers are carried out by soaking the core stuffs in liquid nitrogen in the systems shown in FIGS. 10 and 16, but it may alternatively be performed by using convection of powdered dry ice.

The time for soaking the core stuffs in the baths can be simply adjusted, when required, by changing the number of transferring pitches of the conveyers.

Thus, the combination ice according to the present invention has unevenness on the surface, a unique appearance which is unobtainable by the molds used conventionally and promotes consumers' interest to buy the ices. Also, in the manufacturing method of a combined popsicle according to the present invention, minute crystals contained in a semi-frozen ice material are temporarily gathered to form lumps with large diameter and then the lumps are broken into granules and re-scattered, so that the granules are uneven in size to allow resultant ice layers to have protrusions and recesses at random on the surface. The feature of unevenness can always be obtained stably. Furthermore, in the apparatus according to the present invention, high productivity is achieved because the core stuffs can be treated by being transferred by the sub-conveyer at the same speed as that of the main conveyer and the ice layers can be formed without delay with respect to the operation of the main conveyer.

BRIEF DESCRIPTION OF THE DRAWINGS

FIG. 11 is a sectional view of A—A' in FIG. 10, FIG. 12 is a sectional view of C—C' in FIG. 11, FIG. 13 is a schematic diagram showing a feeding mechanism of a grip plate.

DETAILED DESCRIPTION OF THE PREFERRED EMBODIMENTS

Next, the present invention is described based on examples.

(EXAMPLES 1 AND 2)

An ice cream material which has 20% of overrun and 31% of total solids was first prepared in accordance with the following composition. The prepared ice cream was filled in a mold which was soaked in refrigerant and an end of a flat bar 10 was inserted in the ice cream. The ice cream in this state was frozen to form an ice cream bar having a core stuff (80 cc/bar). The ice cream bar was then taken out of the mold and soaked in a liquid nitrogen bath for 1 sec. to obtain surface temperature of −15° C.

| <Composition of Ice Cream Material> | | |
|---|---|---|
| Skimmed condensed milk | 20.0 | (parts by weight) |
| Butter | 10.0 | |
| Sugar | 8.0 | |
| Stabilizer | 0.3 | |
| Emulsifier | 0.3 | |
| Flavor | 0.2 | |
| Water | 61.2 | |

Also, two kinds of sherbets were prepared according to the composition shown in Table 1 and frozen by a freezer and 20 part by weight of orange flesh was added and scattered in the sherbets to obtain a sherbet material in a semi-frozen state and of 0% of overrun.

TABLE 1

| <Composition of Sherbets> | | | |
|---|---|---|---|
| | a | b | |
| Sugar | 15.0 | — | |
| Starch syrup (B × 70) | — | 70.0 | (parts by |
| Stabilizer | 0.5 | 0.5 | weight) |
| Colorant | 0.5 | 0.5 | |
| Flavor | 0.3 | 0.3 | |
| Water | 83.7 | 28.7 | |

Figure 6:
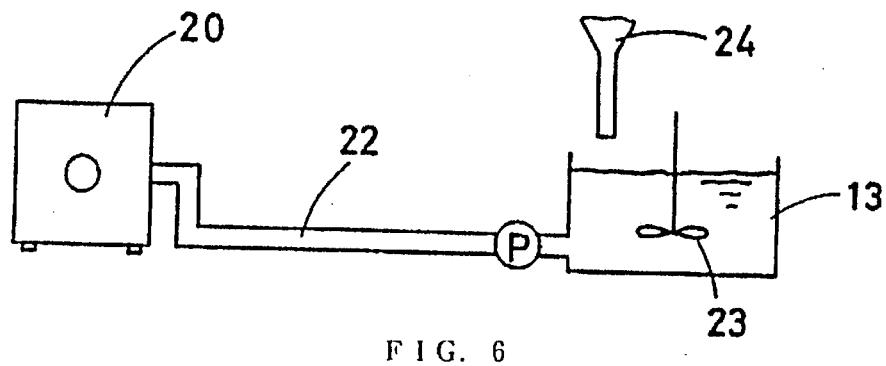
FIGS. 6 and 7 are explanatory views showing a method of obtaining an ice mixture to be used as material for the above ice layer.
Figure 7:
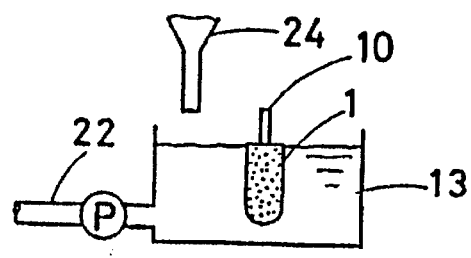
Figure 8:
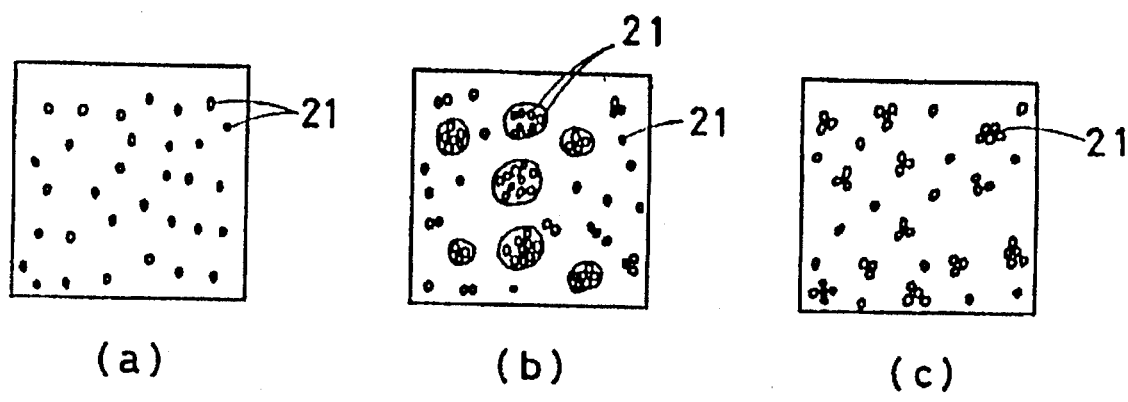
FIGS. 8(a), 8(b) and 8(c) are explanatory views showing the change of state of the ice mixture.

Total solids of the resultant sherbet material a was 16% and that of sherbet b was 50%. Then, the sherbets were used to obtain a combination ice as follows. The sherbet material kept at −2° C. was transferred at the speed of 50 l min. in a pipeline of 60 mm in diameter for five minutes so that minute crystals in the sherbet cohere and form lumps. The sherbet was placed in a soaking bath 13 (See FIG. 6) to be agitated at 150 rpm by blades 23 for 15 min. so that the lumps 21 were broken into granules and re-scattered again. The core stuff 1 was soaked in the sherbet contained in the bath 13 for 2 sec. and then pulled up to obtain an ice of the core stuff 1 having on the outer periphery 40 cc of sherbet material in a form of unevenness.

Figures 1, 2, 3:
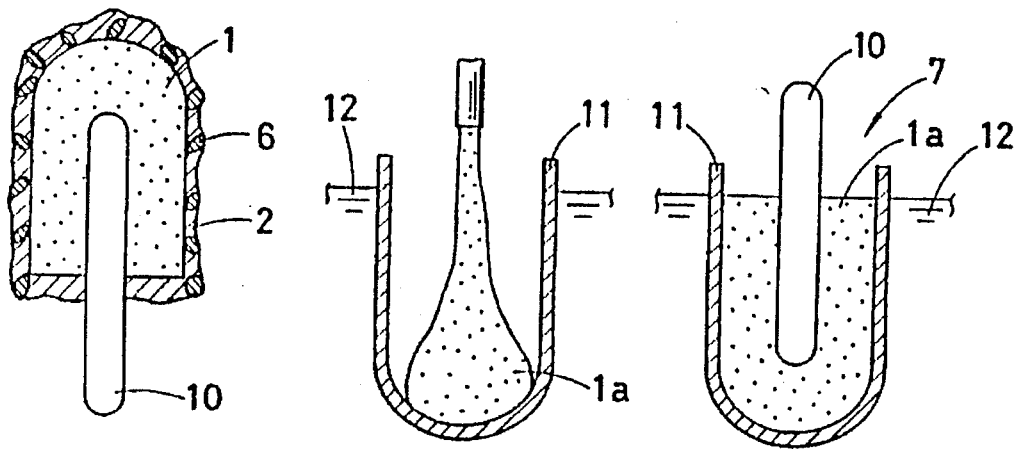
FIG. 1 is a schematic sectional view showing an example of a combination popsicle obtained by the present invention.
FIGS. 2 and 3 are explanatory views showing a manufacturing method of a core stuff used in the above example.
Figure 4:
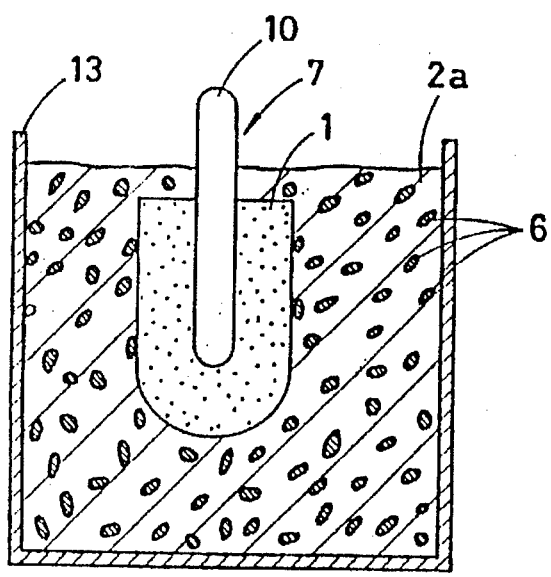
FIG. 4 is an explanatory view showing a method of forming an ice layer on the circumference of the core stuff.
Figure 5:
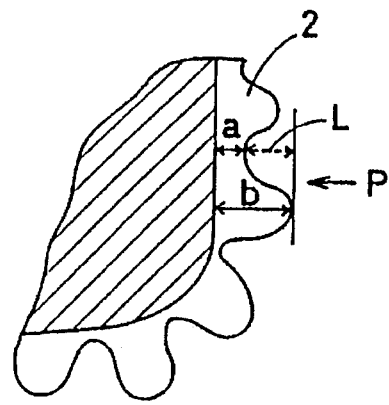
FIG. 5 is an explanatory view showing a state of the surface of the ice layer in the above example.

The ice was soaked in liquid nitrogen bath for 2 sec. to cause the sherbet layer on the surface to be quickly frozen, whereby a combination popsicle was obtained as shown in FIG. 1.

(EXAMPLE 3)

Cracked ice of the following composition was used in place of the sherbet material used in the example 1.

| <Composition of Cracked Ice Mixture> | | |
|---|---|---|
| Sugar | 20.0 | (parts by weight) |
| Flavor | 1.0 | |
| Colorant | 0.5 | |
| Water | 80.0 | |

| <Composition of Cracked Ice Mixture Material> | | |
|---|---|---|
| Cracked Ice Mixture | 100 | (parts by weight) |
| Ice | 200 | |

Figure 9:
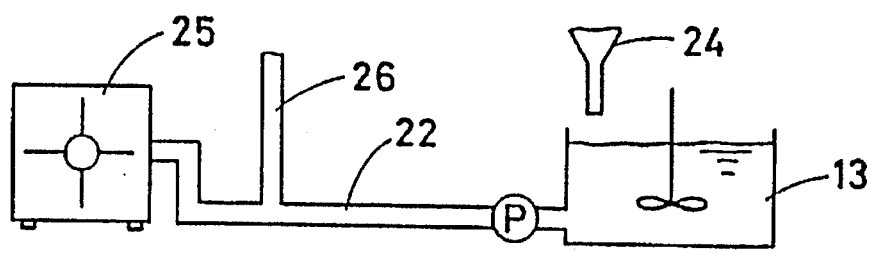
FIG. 9 is an explanatory view showing another method of obtaining the ice mixture.
Figure 10:
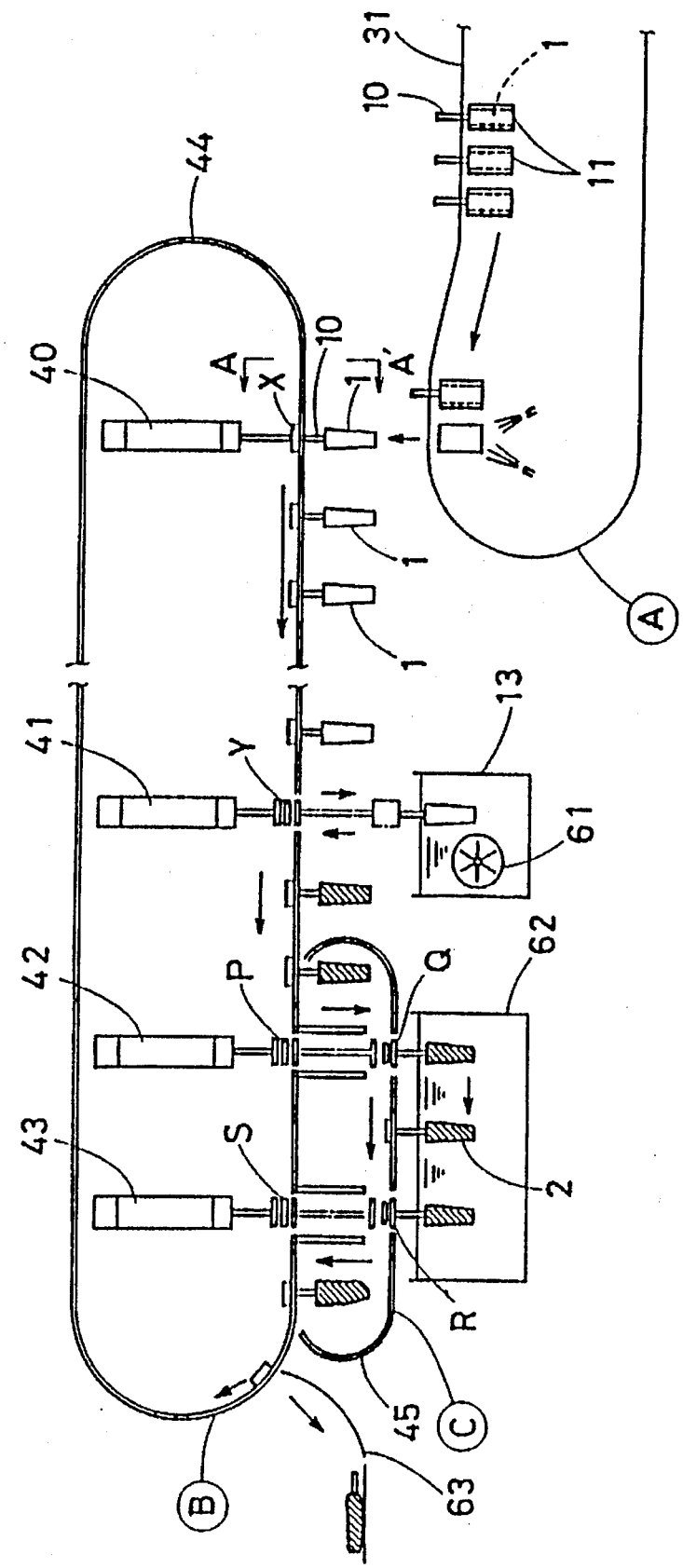
FIG. 10 is a schematic diagram showing a system used for manufacturing the above example.
Figure 14:
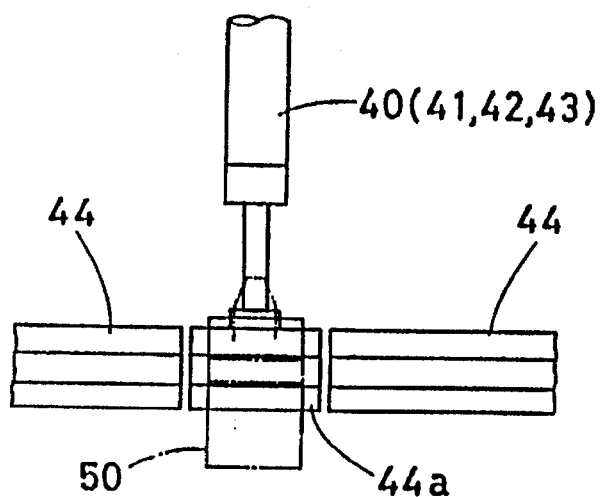
FIG. 14 is a sectional view of B—B' in FIG. 10.
Figure 15:
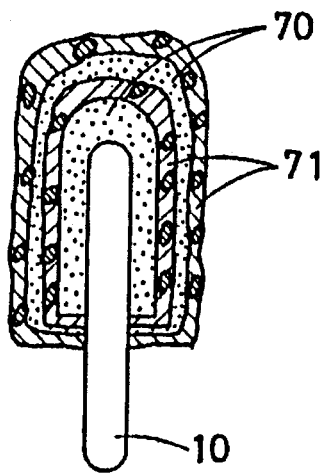
FIG. 15 is a sectional view showing a combined ice of a multi-layered construction.
Figure 16:
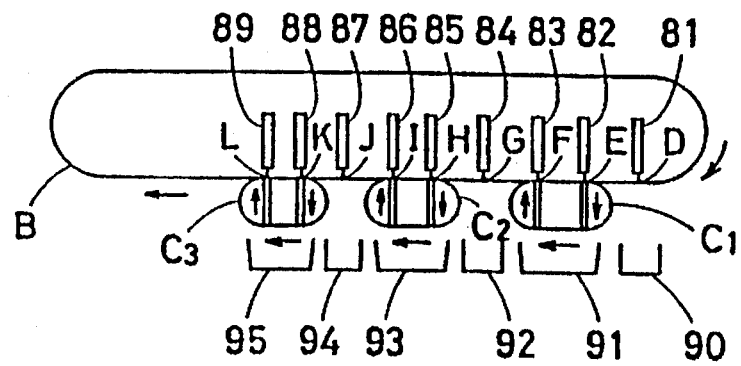
FIG. 16 is a schematic diagram showing an apparatus for manufacturing a multi-layered combined ice.
Figures 17, 18, 19:
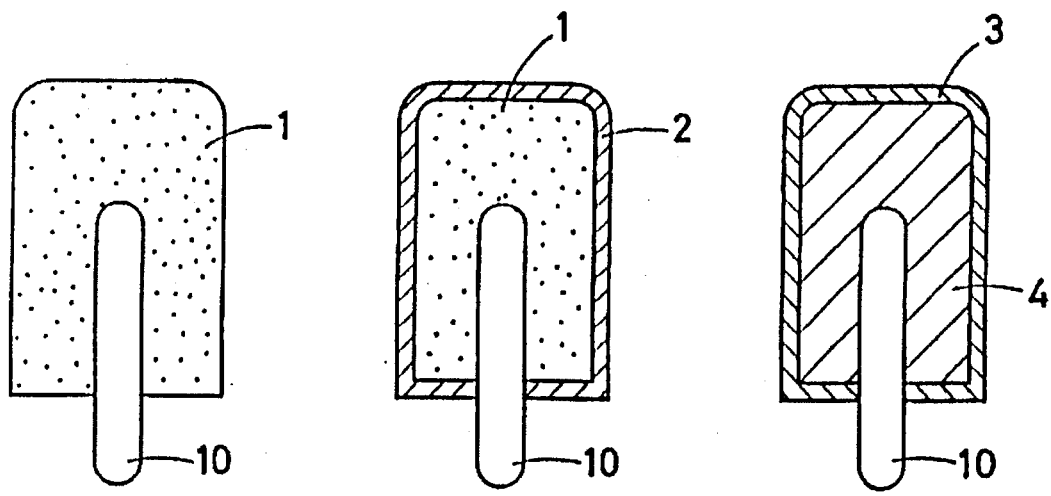
FIGS. 17, 18, 19 and 20 are explanatory views of conventional ices.
Figure 20:
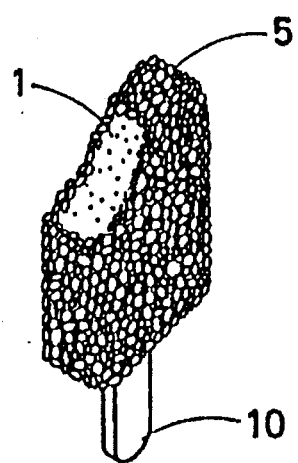

As shown in FIG. 9, ice was first crushed by using an ice crusher 25 (IZUMI Food Machinery Inc., Drum Type Ice Crusher) to obtain minute ice crystals 21. The minute crystals 21 were transferred to the feeding line 22 to which a cracked ice mixture cooled to 5° C. was added and mingled through a pipeline 26 to obtain cracked ice material. The cracked ice material was kept at −2° C. and transferred at the speed of 10 l/min. in the feeding line of 60 mm in diameter for five minutes to cause the minute crystals 21 in the cracked ice material to cohere and form lumps. The cracked ice material was placed in the soaking bath 13 to be agitated at 150 rpm by the blades 23 for 15 min. to cause the lumps 21 to be broken into granules and re-scattered again. The core stuff 1 was soaked in the cracked ice mixture material placed in the bath 13 for 2 sec. and pulled up to obtain an ice of the core stuff 1 having on the outer periphery 40 cc of the cracked ice material in the form of irregularity. The ice was soaked in the liquid nitrogen bath for 2 sec. to cause the cracked ice layer on the surface of ice to be quickly frozen to thereby obtain a combination popsicle.

(Comparative Example 1)

A combination popsicle was obtained in the similar manner to the above examples except that the ice material as well as in the above example was frozen and then placed in the soaking bath 13 and the core stuff was soaked in the ice material instantly without cohering process of ice crystals.

(Comparative Example 2)

A combination popsicle was obtained in the similar manner to the foregoing examples of the present invention except that the ice material as well as in the foregoing examples of the present invention was frozen and then caused minute crystals in the ice material were collected to be lumped, the ice material including lumps was contained in a soaking bath 13, agitation by blades 23 is not conducted, and the core stuff was soaked in the bath 13.

Uniformity and solid appearance of unevenness on the surfaces of the resultant combined ices were visibly examined by 20 professional panelists. Also, the mean difference of height Ln between protrusions and recesses was obtained by the foregoing method. Table 2 shows the examination results. The uniformity and solid appearance were especially examined in the following manner.

<Uniformity>

Whether an uneven ice layer is formed over the whole surface of the core stuff or not was examined.
O: duly formed
Δ: having a few flat parts
X: having many flat parts <Solid Appearance>

Whether a state of the unevenness on the surface of core stuffs is clear or not was examined.

O: Difference in height between protruded parts and recessed parts is clear.

Δ: Difference in height between protruded parts and recessed parts is slightly small.

X: Difference in height between protruded parts and recessed parts is small.

TABLE 2

|  | Examples of the invention | | | Comparative examples | |
| --- | --- | --- | --- | --- | --- |
|  | 1 | 2 | 3 | 1 | 2 |
| Process forming ice layer | | | | | |
| Freezing | done | done | crushing of ice | done | done |
| Cohering | done | done | done | not done | done |
| Re-scattering | done | done | done | not done | not done |
| Evaluation | | | | | |
| Uniformity | O | O | O | X | X |
| Solid appearance | O | Δ | O | X | O |
| Ln (mm) | 4 | 1 | 3 | 0.3 | 10 |

From the above results, it is found that the products obtained by the examples according to the present invention have the shapes of protrusions and recesses over the whole surface of the core stuff and the unevenness is clear to be up-and-down. On the contrary, the ice confection of comparative example 1 are poor in variation of the unevenness and look flat as a whole. And the surface of the ices of the comparative example 2 is extremely raised in a part and does not have a preferable appearance.

What is claimed are:

1. A method of making a combination popsicle with an ice layer having random uneven surface on the outer periphery of a core of edible material, the method comprising steps of preparing a semi-frozen ice mixture containing fine or minute crystals of ice, cohering the fine or minute crystals in the semi-frozen mixture into cakes or lumps, agitating the ice mixture to crush the lumps into granules of uneven diameters and to scatter the granules in the semi-frozen ice mixture, cooling a surface of the core, soaking the core having a cooled surface in a bath of the semi-frozen ice mixture having the scattered granules to form a semi-frozen ice layer on the outer periphery of the core, and quick freezing the semi-frozen ice layer on the core.

* * * * *